United States Patent
Lord et al.

(10) Patent No.: US 11,234,130 B2
(45) Date of Patent: Jan. 25, 2022

(54) SYSTEMS AND METHODS FOR MONITORING USER ACTIVITY

(71) Applicant: Latch Mobile LLC, Natick, MA (US)

(72) Inventors: Christopher Charles Lord, Natick, MA (US); Joshua Andrew Hartley, Malden, MA (US)

(73) Assignee: Latch Mobile LLC, Natick, MA (US)

( * ) Notice: Subject to any disclaimer, the term of this patent is extended or adjusted under 35 U.S.C. 154(b) by 350 days.

(21) Appl. No.: 16/234,094

(22) Filed: Dec. 27, 2018

(65) Prior Publication Data

US 2019/0208412 A1 Jul. 4, 2019

Related U.S. Application Data

(60) Provisional application No. 62/613,003, filed on Jan. 2, 2018.

(51) Int. Cl.
| | |
|---|---|
| *H04W 12/30* | (2021.01) |
| *G06F 16/435* | (2019.01) |
| *G06F 21/31* | (2013.01) |
| *G06F 21/55* | (2013.01) |
| *G06F 21/57* | (2013.01) |
| *H04L 29/08* | (2006.01) |
| *G06K 9/72* | (2006.01) |

(Continued)

(52) U.S. Cl.
CPC .......... *H04W 12/30* (2021.01); *G06F 16/435* (2019.01); *G06F 21/316* (2013.01); *G06F 21/554* (2013.01); *G06F 21/577* (2013.01); *G06F 21/629* (2013.01); *G06K 9/72* (2013.01); *H04L 43/00* (2013.01); *H04L 67/22* (2013.01); *G06F 2221/033* (2013.01); *G06K 2209/01* (2013.01)

(58) Field of Classification Search
CPC .... H04W 12/30; G06F 16/435; G06F 21/316; G06F 21/554; G06F 21/577; H04L 67/22
See application file for complete search history.

(56) References Cited

U.S. PATENT DOCUMENTS

| | | | | |
|---|---|---|---|---|
| 8,312,511 | B2* | 11/2012 | Garbow | H04L 63/1441 |
| | | | | 726/3 |
| 8,806,644 | B1* | 8/2014 | McCorkendale | H04L 63/1416 |
| | | | | 726/24 |

(Continued)

OTHER PUBLICATIONS

[No Author Listed], Boomerang Parental Control—Android vs. iOS Features. Boomerang. Retrieved from the Internet: https://useboomerang.com/boomerang-android-vs-ios-2/. Accessed Nov. 1, 2017; 6 pages.

(Continued)

*Primary Examiner* — Jason Chiang
(74) *Attorney, Agent, or Firm* — Wolf, Greenfield & Sacks, P.C.

(57) ABSTRACT

Systems and methods for monitoring user activity at a mobile device. A method comprises capturing one or more display frames associated with content being displayed by an application executing on of the mobile device; capturing textual information associated with the content being displayed by the application; detecting user input associated with the content being displayed by the application; and evaluating collected data including the captured display frames, the captured textual information, and the detected user input to identify an activity of interest or concern associated with the application.

20 Claims, 10 Drawing Sheets

(51) Int. Cl.
  *H04L 12/26* (2006.01)
  *G06F 21/62* (2013.01)

(56) References Cited

U.S. PATENT DOCUMENTS

| | | | | |
|---|---|---|---|---|
| 9,460,299 | B2* | 10/2016 | Weiss | G06F 21/604 |
| 9,886,461 | B1* | 2/2018 | Sharifi | G06K 9/00469 |
| 2003/0176999 | A1* | 9/2003 | Calcagno | G06F 40/35 |
| | | | | 704/9 |
| 2004/0003279 | A1* | 1/2004 | Beilinson | G06F 21/604 |
| | | | | 726/7 |
| 2008/0282324 | A1* | 11/2008 | Hoal | H04L 51/32 |
| | | | | 726/3 |
| 2009/0089417 | A1* | 4/2009 | Giffin | H04L 51/063 |
| | | | | 709/224 |
| 2010/0312876 | A1* | 12/2010 | Sim | G06F 21/62 |
| | | | | 709/224 |
| 2011/0184982 | A1* | 7/2011 | Adamousky | G06F 21/552 |
| | | | | 707/776 |
| 2014/0280915 | A1* | 9/2014 | Nemer | G06Q 50/01 |
| | | | | 709/224 |
| 2015/0332576 | A1* | 11/2015 | Son | G02C 11/10 |
| | | | | 340/686.6 |
| 2016/0112735 | A1* | 4/2016 | Stephens, Jr. | H04N 21/466 |
| | | | | 725/14 |
| 2016/0306965 | A1* | 10/2016 | Iyer | G06Q 10/105 |
| 2017/0103400 | A1* | 4/2017 | Agarwal | G06Q 30/016 |
| 2017/0201850 | A1* | 7/2017 | Raleigh | G06F 3/0482 |
| 2018/0165936 | A1* | 6/2018 | Smith | H04L 43/08 |
| 2019/0129957 | A1* | 5/2019 | Raikar | H04N 21/47205 |

OTHER PUBLICATIONS

[No Author Listed], How It Works—Bark. Retrieved from the Internet: https://www.bark.us/how/?&gclid=EAlalQobChMlluyNq_edlwlVwlqGCh0ifAlsEAAYAiAAEgKhAPD_BwE. Accessed Nov. 1, 2017; 2 pages.

Shipley, PhoneSheriff Review. 10TopTenReviews. Retrieved from the Internet: http://www.toptenreviews.com/software/privacy/best-cell-phone-parental-control-software/phonesheriff-review/. Accessed Nov. 1, 2017; 2 pages.

Shipley, Qustodio Premium Review. 10TopTenReviews. Retrieved from the Internet: http://www.toptenreviews.com/software/privacy/best-cell-phone-parental-control-software/qustodio-review/. Accessed Nov. 1, 2017; 2 pages.

* cited by examiner

ME omg if I was a loser like you I would kill myself go get hit by a frickin 🚌 nobody would even care Send a chat Thanks | I | We

SYSTEMS AND METHODS FOR MONITORING USER ACTIVITY

RELATED APPLICATIONS

This Application claims priority under 35 U.S.C. § 119(e) to U.S. Application Ser. No. 62/613,003, filed Jan. 2, 2018, and titled "SYSTEMS AND METHODS FOR MONITORING USER ACTIVITY," the contents of which are incorporated herein in its entirety.

COPYRIGHT NOTICE

Portions of the material in this patent document are subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

Conventional parental monitoring solutions manage specific applications running on mobile devices by tracking, blocking, or allowing the applications. These solutions rely on inventory and knowledge of the applications being used, when and where the applications are being used, and who is using the applications. The conventional monitoring approach assumes that an application is the unit of maliciousness, abuse or danger and relies on simply blocking any applications considered to be malicious/dangerous or allowing any applications considered to be safe.

SUMMARY

Various aspects of the present disclosure describe systems and methods for monitoring user activity to assess vulnerability. Various embodiments of the systems and/or methods provide enhanced functionality for monitoring entire execution environments (e.g., on a mobile device) and further enable functions that various conventional approaches cannot provide. These embodiments establish a dynamic monitoring system with feedback integration that further provides dynamic updates to threat models and threat detection. For example, unlike conventional approaches a monitoring system embodiment can detect new functionality in a previously "safe" application as the new functionality is executed. The new functionality is evaluated for threat and/or risk level and can be blocked, frozen, or trigger alerts for further review accordingly. The dynamic monitoring and evaluation capabilities include functionality that various conventional approaches fail to provide and cannot implement (e.g., static safe list and/or static risky lists).

According to some aspects, the inventors realized that conventional monitoring solutions (e.g., parental monitoring solutions) that track MMS messages or block Snapchat (due to its capabilities related to disappearing messages) are not able to recognize similar activity taking place in different applications (e.g., Instagram, Hash, Wickr, Ansa, etc.), and further cannot identify the same suspect operations in standard services and standard capabilities available on the mobile device. New applications having the same features or functionality represent a significant vulnerability—as conventional approaches that block a known existing application (e.g., Snapchat) are unable to identify the same functionality in a new application.

Various embodiments are directed to computer implemented methods for dynamically evaluating execution of applications or operations on a mobile device. The method comprises capturing, with a virtual display component, one or more display frames associated with content being displayed by the application executing on the mobile device; capturing, with a virtual reader, textual information associated with the content being displayed by the application, detecting, with a virtual input component, user input associated with the content being displayed by the application; and generating an activity profile associated with the application.

Some embodiments are directed to a computer implemented method for monitoring user activity at a mobile device. The method comprises capturing one or more display frames associated with content being displayed by an application executing on of the mobile device; capturing textual information associated with the content being displayed by the application; detecting user input associated with the content being displayed by the application; and evaluating collected data including the captured display frames, the captured textual information, and the detected user input to identify an activity of interest or concern associated with the application.

Some embodiments are directed to a system for monitoring user activity. The system comprises a mobile device and a backend system. The mobile device comprises at least one processor, operatively connected to a memory. The at least one processor when executing is configured to: monitor one or more user interactions detected at the mobile device with respective applications installed on the mobile device, wherein monitoring the one or more user interactions comprises: capturing one or more display frames associated with content being displayed by the applications, capturing textual information associated with the content being displayed by the applications, and detecting user input associated with the content being displayed by the applications. The at least one processor when executing is configured to communicate collected data including the captured display frames, the captured textual information and the detected user input to a backend system. The backend system comprises at least one processor, operatively connected to a memory. The at least one processor when executing is configured to: analyze the collected data to detect an activity of interest or concern, and generate one or more alerts based on the detected activity.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example.

The appearances of such terms herein are not necessarily all referring to the same example.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIG. 7 shows an example screen/display frame captured at the mobile device, according to one embodiment;

DETAILED DESCRIPTION

Figure 1:
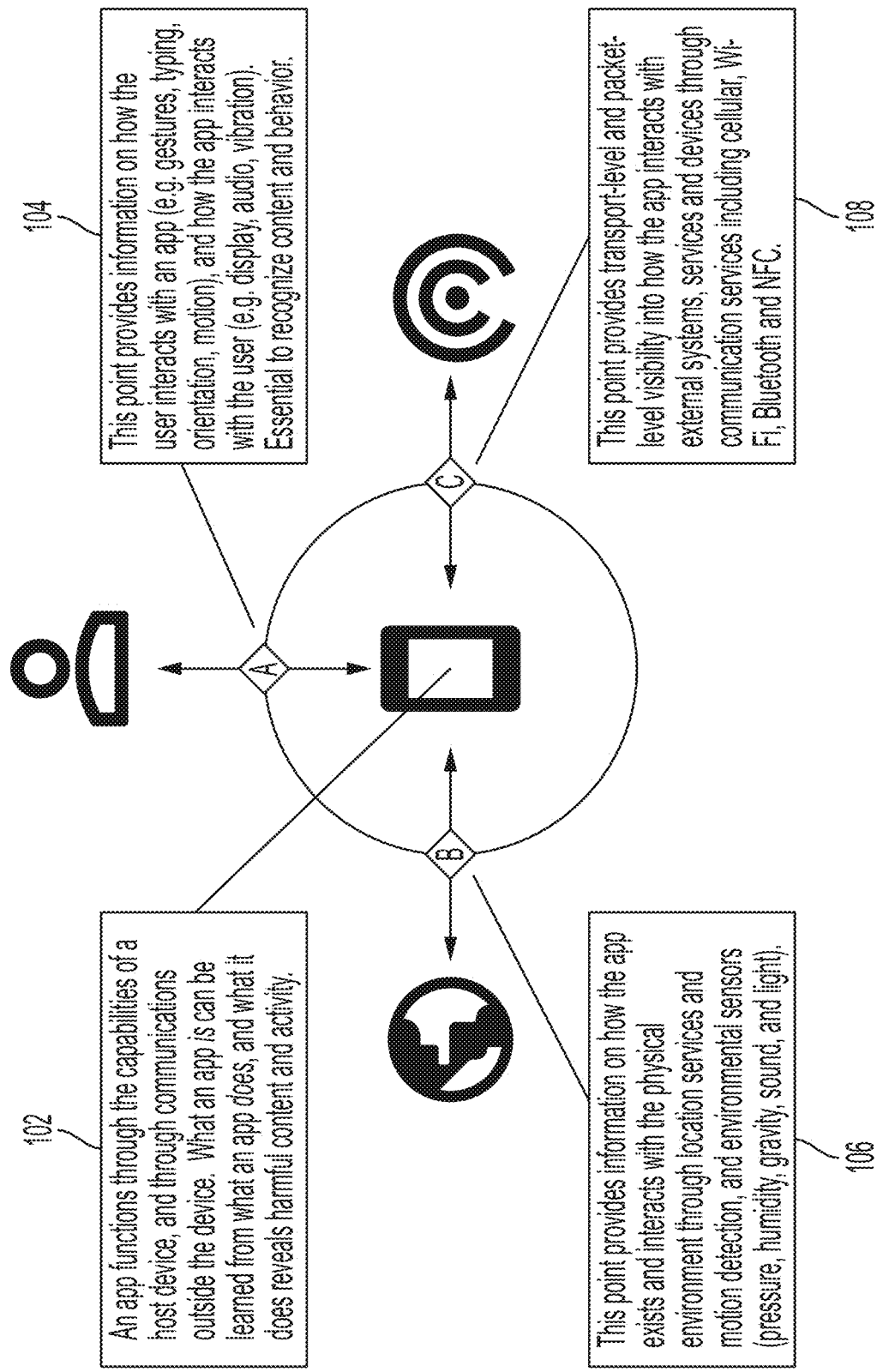
FIG. 1 is a diagram depicting a number perspectives or vantage points for collecting information, according to one embodiment.

According to one aspect, an activity of interest or concern can occur in many different applications, including those that are commonly allowed or considered safe. Various embodiments provide new monitoring and assessment capability that extends into "safe" applications (and for example, risky or unsafe applications) to assess executing functionality for risk or threats. For example, sending, receiving and viewing of explicit personal photos is not limited to multimedia messaging applications (e.g., multimedia messaging service (MMS) applications) and can be performed using other applications that can reduce the risk of being caught (e.g., Snapchat that has a disappearing messages capability where any exchanged messages disappear after approximately 3-5 seconds) or other standard file sharing services (e.g., Dropbox and Google Drive). Conventional monitoring solutions (e.g., parental monitoring solutions) that track MMS messages or block Snapchat (due to its capabilities related to disappearing messages) are not able to recognize similar activity taking place in different applications (e.g., Instagram, Hash, Wickr, Ansa, etc.), and further cannot identify the same suspect operations in standard services and standard capabilities available on the mobile device. According to another aspect, new applications having the same features or functionality represent a significant vulnerability—as conventional approaches that block a known existing application (e.g., Snapchat) are unable to identify the same functionality in a new application.

Even existing applications viewed as safe are continuously evolving with new capabilities and features. Conventional approaches fail to learn about these continuously evolving capabilities and features. Even parents actively monitoring their children, device, and applications can fail to appreciate how existing or new features can be subverted. Ultimately, neither parents nor conventional parental monitoring solutions can keep up with the dynamic nature of modern computing. Unfortunately, this is true even where parents or conventional monitoring services understand the risks and appropriateness of an application at some time in the past. For example, the risk (e.g., abuse able feature) present in one application does not need to remain specific to that particular application, and can be a generalized feature of many applications. If a parent blocks Snapchat because of its capability relating to disappearing messages, the same function in Instagram is undetected and undeterred, as a similar capability is also supported by or was subsequently added to Instagram.

Given the rapid shifts in application preferences (where, for example, one anonymous chat application is quickly replaced with another) and in commoditization of application features (where, for example, the disappearing messages feature becomes available in an increasing number of applications), an improved monitoring approach is needed that identifies and mitigates the risk of using applications without requiring a priori knowledge of any specific application, that is resilient to changes occurring in existing applications, and that is effective against new applications.

In some embodiments, per the improved monitoring approach, information is collected from a plurality of perspectives or vantage points 102, 104, 106, and 108, as shown in FIG. 1, and the collected information is used to recognize behavior and risks independent of the application. In some embodiments, an application executing on a mobile device may be treated as a communication channel between the user, the physical world, and the digital world, and the information collected. For example, monitoring activity from these perspectives or vantage points 102, 104, 106, and 108 provides insight into user activity, context, and content. In some implementations, an activity profile for the application executing on the mobile device may be generated based on the collected information.

According to one embodiment, an activity profile enhances a standard app manifest (the declared set of resources, claims and permissions associated with an app) with observations (e.g., monitoring of execution, program calls, external resource calls, etc.) of what the app actually does as determined by monitoring of apps across all installed instances. In some examples, the system collects information from multiple user devices, installations, etc. to build a comprehensive manifest of features and functions—improving the capability to assess risks for any application or function, and improve over other conventional approaches. For example, an "app" might be described as a game and require access to contacts and internet (based on app store and manifest information). But that app might be observed by the system as having interactive chats (e.g., associated with a high risk profile) with other players based on text analysis. The app profile would be updated with this capability and the enhanced description made available across the system and to all users so the system and the users can better evaluate the risks posed by apps regardless of the stated capabilities or purpose. In another example, chat functionality may be included in a mini-game expansion, thus not appear on a list of features or functions initially. Thus, many conventional approaches would fail to properly assess the risk and could also fail to monitor the expanded functionality for risk associated with the chat content.

According to some embodiments, the activity profile may establish at least one or more of the following: information on how the user interacts with the application, information on how the application interacts with the user, information on how the application interacts with the physical environment, information on transport-level operations (e.g., with external systems, services, devices, communication services (e.g., cellular, Wi-Fi, Bluetooth, NFC, etc.)), and information on packet-level operations (e.g., with external systems, services, devices, communication services (e.g., cellular, Wi-Fi, Bluetooth, NFC, etc.)).

According to some embodiments, the collected information and/or the activity profile may be used to determine whether an activity of interest or concern associated with the application is detected. In one example, the system can be configured to detect that an explicit photo was just taken, modified and sent via Instagram. In another example, the system can be configured to detect harmful content, dangerous conversations, risky behavior, and/or other concerning content or activities.

According to one aspect, the information may be collected and the activity of interest or concern may be detected regardless of the application being used. For example, the fact that the explicit photo was taken and sent would be detected regardless of whether the photo was sent via Snapchat, Instagram, or a MMS message. Therefore, the activity of interest or concern is detected from the perspective of the user and the mobile device that hosts the application. Various embodiments, implement an application agnostic monitoring approach. The approach builds threat signatures based on modelled capabilities (e.g., functionality) that reflect dangerous or suspect activity and/or operations. The signatures or modelled capabilities can be used to evaluate any application, new, existing, updated, etc. And regardless of the application under review and if functionality is not readily apparent on installation, monitoring can identify and block dangerous activity (e.g., even at a function level).

Figure 2:
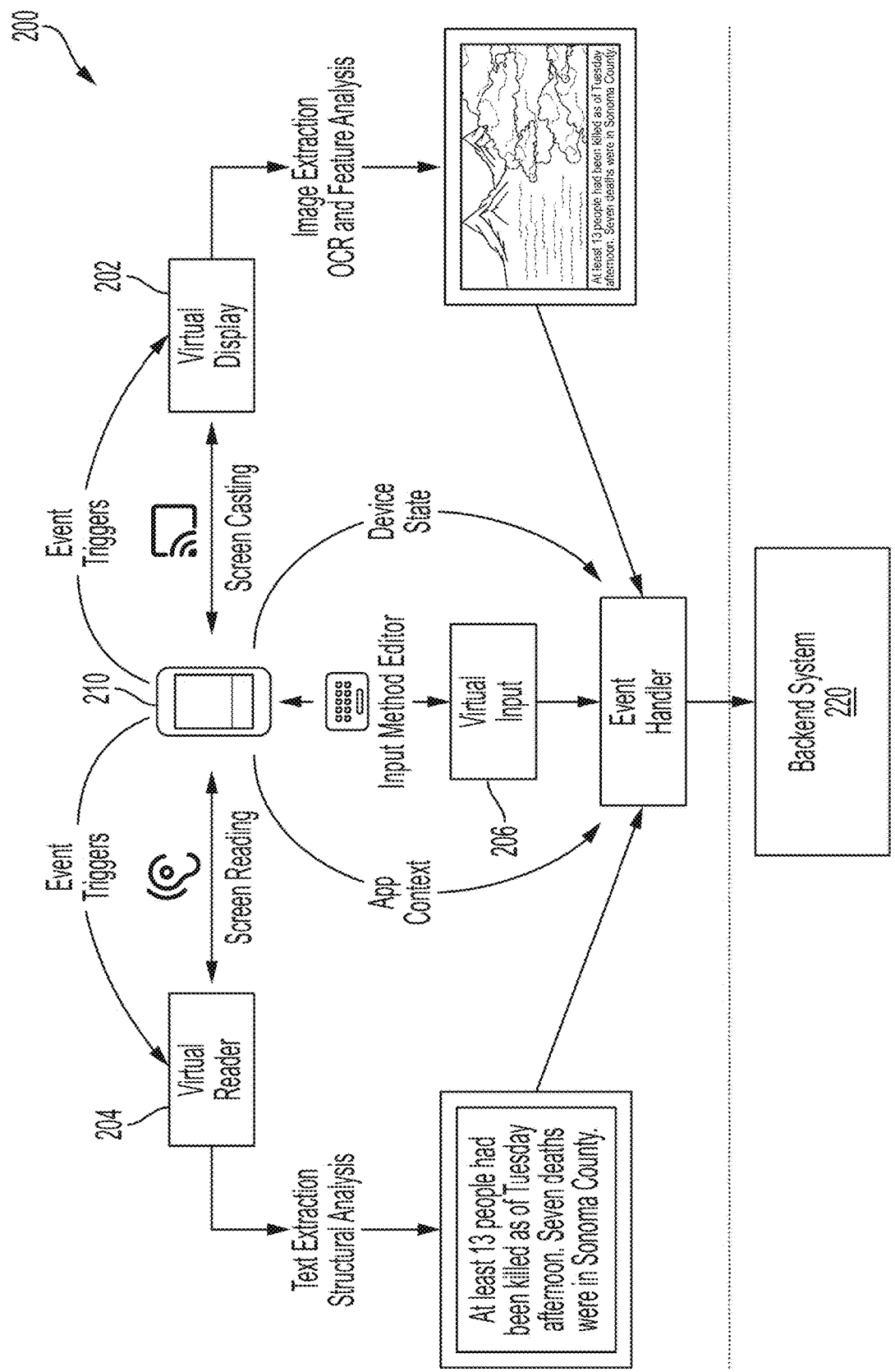
FIG. 2 is a diagram depicting various processes and functions performed at a mobile device, according to one embodiment.

In some embodiments, a system 200 implementing the improved monitoring approach, as shown in FIG. 2, is used to monitor user interactions or activity at the mobile device 210, collect information associated with the plurality of perspectives 102, 104, 106, and 108 described above, and dynamically evaluate execution of applications or functionality on the mobile device 210. In some embodiments, system 200 captures information from each of the plurality of perspectives without the need to root, jailbreak or otherwise compromise or exploit the security of the mobile device 210. In some embodiments, the ability to monitor without further compromising the security of the device (e.g., root, jailbreak etc.) represents another advance over conventional approaches. According to one embodiment, the system 200 captures input and output through virtual devices 202, 204, 206 using native platform and device capabilities that provide visibility for each perspective. In some implementations, at least a portion of the information captured through the virtual devices 202, 204, 206 is communicated to a backend system 220 for further analysis. In some implementations, the backend system 220 may include one or more servers, one or more databases, and/or one or more cloud-based systems.

In some examples, the information captured is used by the system to identify suspect activity—that can trigger an alert to a parent or block the functionality on the application until a parent, guardian, or administrator authorizes the function. In some setting, the identification of suspect activity can trigger additional logging, video capture, etc., to assist a guardian, administrator, etc. in subsequent evaluation.

According to one embodiment, the mobile device 210 includes a virtual display component or device 202 that provides screen-casting capability. For example, the virtual display component can be configured to screencast a continuous stream of images or frames associated with content being displayed by an application executing on the mobile device 210. In some implementations, the stream of images/frames that may be sent to another device (e.g., a video monitor or projector). In further implementations, the screen-casting is performed at a relatively low frame rate. For example, the default frame rate for image capture can be set at 2 fps and for text capture at 4 fps but the system can be configured to respond/capture as event driven actions—thus in some examples actual capture rates vary between 0.5-4 fps for images and 0.5-8 fps for text (and in further example, shorter or longer capture rates can be used (e.g., 0.1 fps-30 fps, and even dynamically changed in response to detected activity or change threat analysis). According to one embodiment, the system is configured to detect when the window content changes (e.g., via a system notification) and the system initiates both a text capture and screen frame capture based on this event. In one example, the system is configured to limit the execution of text capture and frame capture to at least a minimum value (e.g., 250 ms (system configurable)) since the last successful capture.

According to various embodiments, the system by default balances the resources (battery consumption and network) required against the accuracy necessary to detect events via the sampling rate or minimum capture time threshold. In further embodiments, the system can dynamically alter sampling rate and/or minimum limits between captures. In one example, the sample rate can increase (or minimum decrease) in response to push notifications from the server based on detected events.

In other examples, the effective frame rate (as seen from the server) can be substantially lower given deduplication of very similar images (e.g., using a perceptual hash calculation and comparison of recently captured frames) and identical text content (e.g., using text hash digests).

Based on one or more user interaction events or one or more change events detected at the mobile device 210, one or more display frames from the continuous stream of frames is captured. In some implementations, the change events can include window change events, content change events, and/or other events that capture any change in the user interaction, the structure, or the content of application.

According to some embodiments, the mobile device 210 includes a virtual reader component or device 204 that provides screen-reading capability. For example, the virtual reader component can be configured to read or capture all window elements and textual information associated with content being displayed by the application.

In further embodiments, the mobile device 210 includes a virtual input component or device 206 that provides input method editor capabilities. For example, the input method editor can be configured to detect or recognize user input (e.g., soft and hard keyboard strokes, button presses, handwriting, gestures, etc.) associated with the content being displayed by the application. FIG. 2 depicts an example where user input regarding a search for "ca wildfires" is detected and information associated with the search is captured via the virtual display component 202 and virtual reader component 204. In some implementations, the system determines which display frames of the continuous stream of frames to capture based on the user input that is indicative of user interactions with the application. For example, the system can capture screen frames responsive to user gestures such as, clicking a button to send a photo. In other embodiments, the system can be configured to limit information capture to specific events (e.g., user gesture, user interface action (e.g., swipe right or left), etc.). In some implementations, the system can capture screen frames responsive to window change events such as, sending the photo. In further implementations, the system can capture screen frames responsive to content change events such as, a received photo. According to various embodiments, the user interactions and/or change events may trigger frames associated with a disappearing message to be captured as the message is being viewed, modified, or sent regardless of the type of application used. It will be appreciated that the user interactions and events described herein are exemplary and other types of user interactions and events may be used to determine frames to be captured.

Table 1 provided below provides a summary of information obtained through the different virtual components.

TABLE 1

| Capability | Component | Information Obtained |
|---|---|---|
| Screen Reading | Virtual Reader | This allows access to all window elements (the structural components of the application such as buttons, controls, edit boxes and text views), their configuration and layout, and their textual content. This reveals how the app interacts with the user. Results are sent to a backend system (e.g., associated with a cloud service) for further analysis. |
| Screen Casting | Virtual Display | This allows access to the individual display frames seen by the user, equivalent to a continuous stream of screen shot images. Lightweight analysis of each image is performed to de-duplicate similar images and to identify key features (text blocks and standard elements like action bars). Selected images are downscaled and compressed, and sent to the backend system for further analysis. |
| Input Method Editor | Virtual Input | This allows access to all user input and input control in the app. It is used in a pass-through mode so that input is observed but not modified. The input allows the system to differentiate content that is consumed (such as reading a news article or receiving a chat message) and content that is produced (such as replying in a chat). Content and control information is sent to the backend system where it is used for correlation with the window elements obtained through the virtual screen reader. |

In some embodiments, in addition to the information from the virtual components 202, 204, 206, contextual information about the application and the mobile device is captured at the time the information is generated/collected. The contextual information captured at the mobile device may include information regarding an application profile that is currently active, a user profile that is currently active, the current location of the mobile device, motion, connectivity, sensor state, and/or other information. The application profile may indicate the name/type of the application, the application package, and/or other information about the application.

According to various embodiments, optical character recognition (OCR) techniques may be utilized to extract text from one or more captured display frames associated with the application. According to one embodiment, in scenarios where the application is integrated with or allows content to be read via the virtual reader 204, textual information associated with the captured display frames is also captured via the virtual reader 204. In some embodiments, the extracted text is compared against textual information captured via the virtual reader 204 to remove duplicate text.

In some embodiments, one or more elements to be removed from the extracted OCR text may be identified. For example, the OCR text may include elements associated with button labels, time displayed at a corner of the screen, and/or other screen or structural layout elements that are irrelevant and can be removed from the OCR text prior to sending the text to the backend system 220 for further analysis. In some embodiments, models characterizing the structural layout of applications and recognizing irrelevant elements (e.g., elements that do not vary between applications during use) may be built. The models may be applied to the OCR text to remove the irrelevant elements. Such filtering of the extracted text improves the efficiency of the system 200 because irrelevant elements can be excluded from the analysis.

According to some embodiments, the collected information including information captured and/or detected via the virtual components 202, 204, 206 is communicated to the backend system 220. In some implementations, at least a portion of collected information including the captured display frames, the captured textual information, and/or detected user input is communicated from the mobile device 210 to the backend system 220. In some implementations, each of the captured display frames may be communicated to the backend system 220. At the backend system 220, perceptual hashing techniques may be applied to the captured display frames to eliminate display frames that do not have significant changes in content. This improves the efficiency of the system 200 because unnecessary frames can be excluded from the analysis.

In some implementations, the captured display frames along with the OCR text associated with the frames is communicated to the backend system 220. In some implementations, the captured display frames may be communicated to the backend system 220 and the OCR techniques may be applied to the frames at the backend system 220.

According to some embodiments, textual information obtained via the virtual reader 204 is communicated to the backend system 220 along with the associated display frames. According to an embodiment where the textual information is compared against the OCR text at the mobile device 210, the de-duplicated text is communicated to the backend system 220 along with the associated display frames. In some implementations, additional comparison and deduplication of text may be performed at the backend system 220.

In some embodiments, the backend system 220 performs image and textual analysis to detect an activity of interest or concern based on categories or sensitivity thresholds set by a user. For example, a parent may set thresholds for adult content, violence, drugs, language, and/or other content. When one or more display frames and/or text are associated with an activity that triggers the thresholds set by the parent, alerts or notifications may be generated and communicated to the parent via one or more communication methods (e.g., email, SMS, push notifications, etc.). In some embodiments, a dashboard is generated and updated that presents the display frames and/or text associated with the activity. In some embodiments, captured contextual information is used when alerts are provided to the parent. For example, an alert may be generated and communicated to the parent when an explicit photo is taken and sent because this activity triggers the threshold of adult content set by the parent. The alert, in addition to the display frame and/or text associated with the activity, may include contextual information, such as, the application used to send the photo (e.g., Snapchat or Instagram), the location of the mobile device when the photo was taken and sent (e.g., at school or at home), the time at which the photo was taken and sent, and/or other contextual information.

As discussed, the backend system 220 performs image and textual analysis to detect an activity of interest or concern based on categories or sensitivity thresholds set by a user. According to various aspects, the image analysis used to detect activity of interest or concern or determine threat level or risky behavior can be challenging and there is no single technique or model that addresses all the categories of image analysis employed by the system. Even with a single category or class of images like nudity/pornography many techniques and functions are executed by the system to analyze an app, associated functions, and/or behaviors. According to various embodiments, the system executes a hybrid of different techniques with different computational requirements to efficiently predict image content categories and uses receiver operating characteristic ("ROC") curves to adjust to user-specific sensitivity settings. For example, the system can evaluate any one or more or any combination of the following: Color and exposed skin recognition using YCbCr and HSV models, Shape and texture recognition using a cascade of boosted classifiers working with local binary patterns, and Adult content detection using CNN model trained on millions of labeled samples. Additional embodiments are configured to augment analysis by integrating or confirming with third-party services (e.g., via application programming interfaces "API") to complement and cross-check analysis results.

In further embodiments, text analysis is executed on the system by several specialized machine learning models that focus on, for example, sentiment, emotional content, social content, links and references (e.g. contacts, phone numbers, URLs), and specific language categories (e.g. aggression, depression, self-harm, drug abuse). For example, the sentiment and emotion analysis model was trained on over two billion social media posts and has been validated using over 40,000 human-rated posts. The sentiment and emotion analysis model maps text to eight basic emotions (acceptance, anger, anticipation, disgust, joy, fear, sadness, surprise) with weights and allows for the classification of 32 different emotions using Plutchik dyads.

Figure 3:
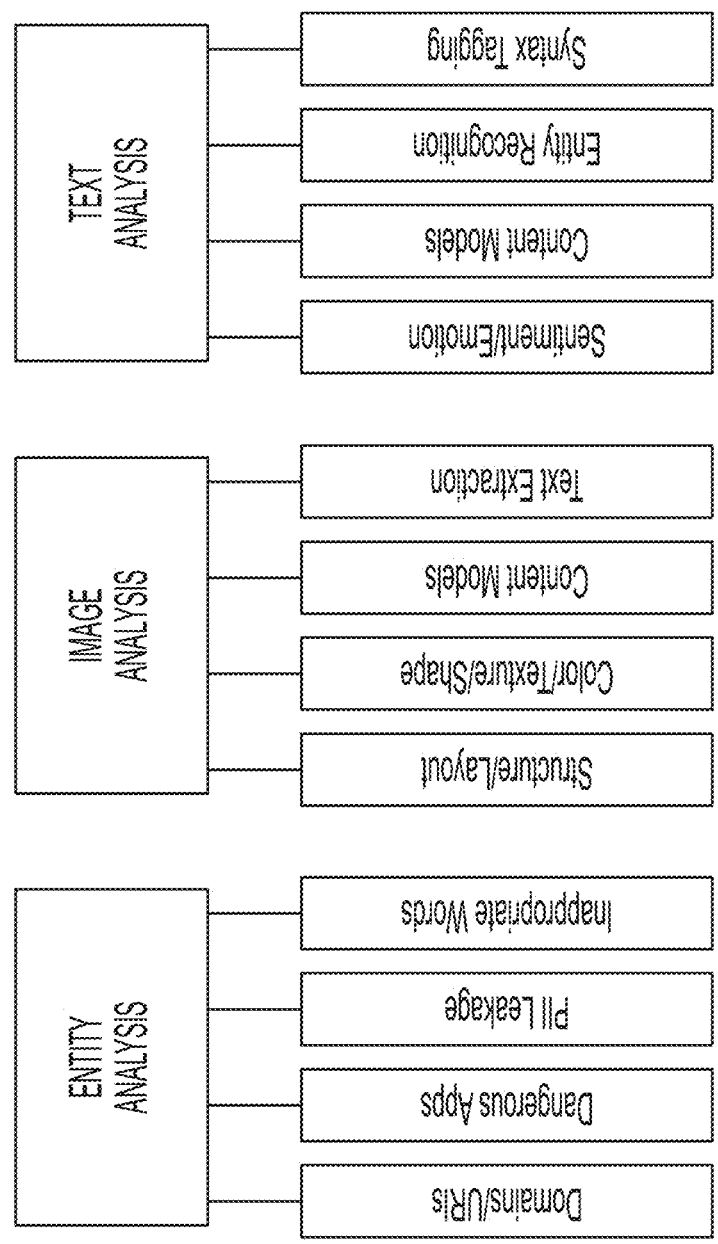
FIG. 3 is a diagram depicting example analyses performed at a backend system, according to one embodiment

According to various embodiments, various imaging, entity, and textual analysis models, as depicted in FIG. 3, for example, may be utilized to detect the activity of interest or concern. For example, textual analysis models may be applied to the OCR text and/or text from the virtual reader 204 to recognize concerning language. The textual analysis models may perform sentiment analysis to understand an overall sentiment of a block of text and recognize language indicative of self-harm, depression, aggression, eating disorders, and/or any other language indicative of concern. In some embodiments, textual analysis models may identify or recognize relevant entities for a block of text and label them with types such as, person, organization, location, events, products, and media. In some embodiments, textual analysis models may perform syntax analysis to identify parts of speech and create dependency parse trees for each sentence to reveal the structure and meaning of text. In some embodiments, textual analysis models may identify one or more emotions associated with a block of text.

In some embodiments, global imaging and textual analysis models may be generated and stored at the backend system 220 and the models may be used for analyzing the display frames and/or textual information received from any number of mobile devices 210.

According to some embodiments, collection of data at the mobile device may be modified based on evaluation/analysis of the collected data. In one example, the system is configured to dynamically alter collection and/or analysis functions in response to a detected event. In one instance the system alters the rate/accuracy of data collection. The system initiates and terminates increase data capture rates via push notifications (e.g., from the server). In some embodiments, the effective fps rate for screen captures and rate for text extraction for an app is increased in response to a detected event in that app. The system is able to adapt to perceived risk by collecting more comprehensive context and content for suspect events.

Figure 4:
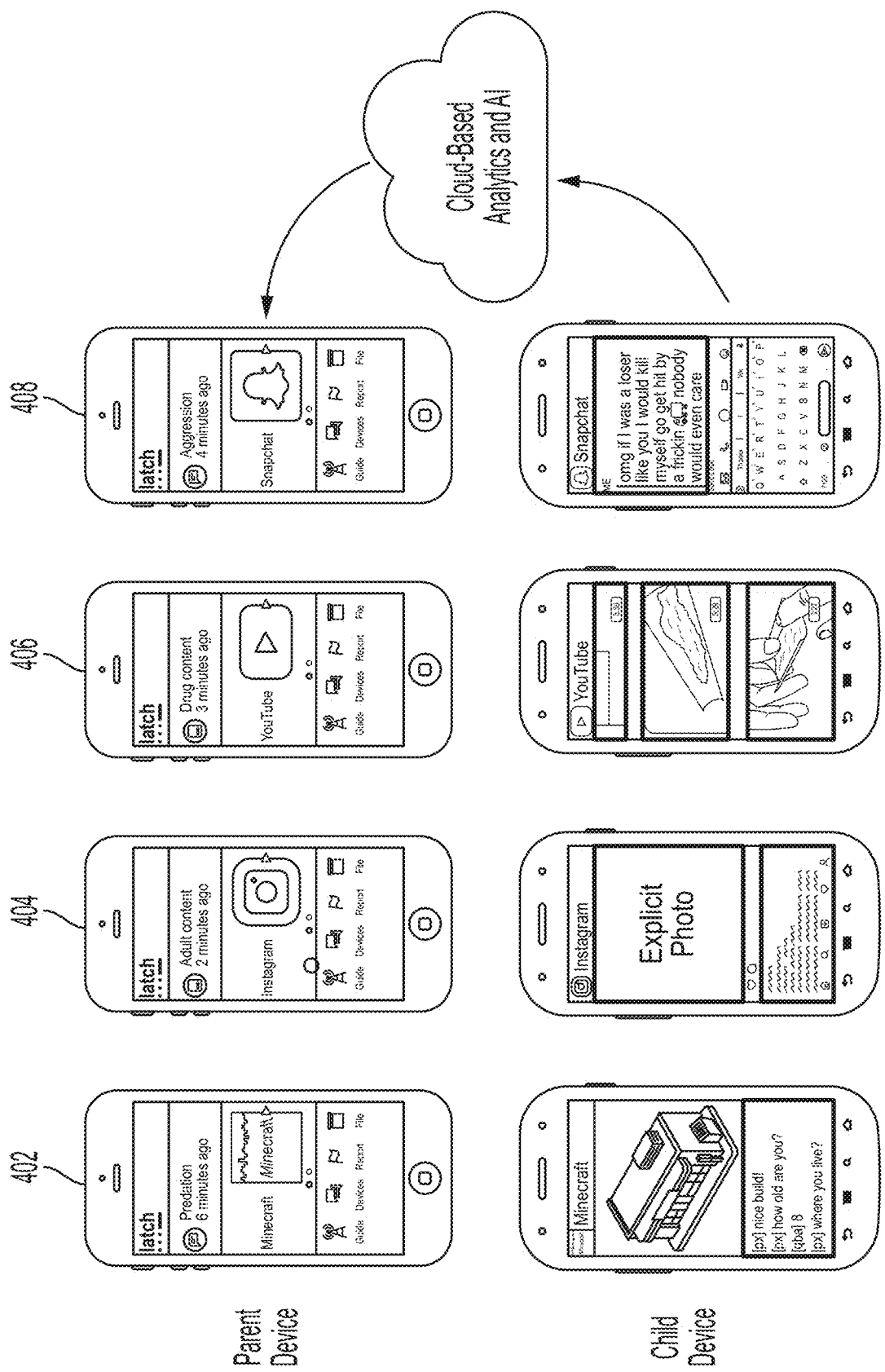
FIG. 4 depicts exemplary alerts generated for different types of concerning activities, according to one embodiment.

FIG. 4 depicts exemplary alerts generated for different types of concerning activities. Alert 402 is generated when a predatory chat that has occurred in the Minecraft application is captured at the mobile device 210. Alert 404 is generated when adult content is detected in the Instagram application at the mobile device 210. Alert 406 is generated when drug content is detected in the YouTube application at the mobile device 210. Alert 408 is generated when an abusive chat that has occurred in the Snapchat application is captured at the mobile device 210.

In some embodiments, a child's mobile device (e.g., mobile device 210) may be registered or paired with a family account. A parent may create a family account by using a parent's mobile device to interact with the backend system 220. The parent may install a monitoring application on the child's mobile device. The monitoring application installed on the child's device may be paired with the family account through the presentation of QR codes. For example, the child's device may be used to scan a QR code presented on the parent's device, which causes the child's device to be paired with the family account at the backend system 220.

Once the registration process is completed, the mobile device 210 is continuously monitored to capture display frames, textual information, and/or user input as described above.

According to some embodiments, the backend system 220 receives information collected from a number of mobile devices and uses the collected information to build models of application capabilities that may be different and independent from declared or known application capabilities. For example, a particular application that is used for messaging may be identified through textual content of images collected from the application and keyboarding activity performed during application use regardless of whether that application is known as being a chat/messaging application. For instance, a gaming application may allow in-game chat sessions or conversations even though it is not known as a messaging application. An application model associated with the gaming application may be built that includes in-game conversations as a capability provided by the gaming application even though this capability is not listed in declared or known capabilities of the gaming application. In further embodiments, the backend system 220 may build threat signatures based on the modelled capabilities that reflect dangerous or suspect activity and/or operations (e.g., in-game conversations). In yet other embodiments, these models and/or threat signatures can be used to evaluate different applications and alert parents who may not be aware of the capabilities of different applications. For example, when a child installs the gaming application on the mobile device 210, the models and/or threat signatures can be used to evaluate the gaming application and an alert may be generated and presented to the parent indicating that—the gaming application was installed and the gaming application has in-game conversation capabilities. In some embodiments, the alerts may include guidance regarding how the capability can be disabled and/or other guidance.

In some implementations, as and when new applications are installed for which application models do not exist at the backend system 220, the declared or known capabilities of the new application are compared against capabilities of existing models, to identify and provide guidance to the parent regarding any capabilities that may be of concern. For example, in-game conversations may be a capability that is known to be exploited by predators. When a new application that supports this capability is installed, an alert may be generated to the parent providing this information. As will be appreciated, use of the new application at the mobile device 210 will result in information to be collected and analyzed to continuously update the application model associated with the new application. Moreover, information learned from use of the new application at one mobile device may be leveraged by the backend system 220 to enhance application models and the analysis performed with respect to other mobile devices.

According to various embodiments, the system 200 applies the same approach as described above to many other areas including networking, environmental sensors, microphone and audio, and cellular and RF signaling.

In some embodiments, the system 200 may also monitor network traffic generated by the application. The network traffic may be analyzed to identify malicious applications and/or domains as will be appreciated. In some embodiments, analysis of network traffic may trigger additional evaluation of the application.

According to some embodiments, the analysis of network traffic is done on the back end (e.g., server) based on, for example, netflow and locally extracted domains and URLs that are accessed. The analysis can be configured to invoke third-party threat intelligence and categorization (for example, access lists of known porn sites). The system in response to detected events can trigger increases in the rate or accuracy of sampling. Further, for an event like a network connection or change in Bluetooth connectivity state, these represent events that trigger the system to execute a default capture of screen frames and execute text extraction. Thus, in various examples, the system responds to event triggers to initiate sampling. According to other embodiments, the capacity for network activity detected by the system is associated with the app and becomes part of the profile for that app.

Example Implementations and Functions

Various embodiments of the system 200 can implement various functions and features descried herein. Described below is an example of functions and features implemented by the system 200 when an abusive chat that has occurred/is occurring in a Snapchat application on a mobile device, as shown in FIG. 5, for example.

Figure 5:
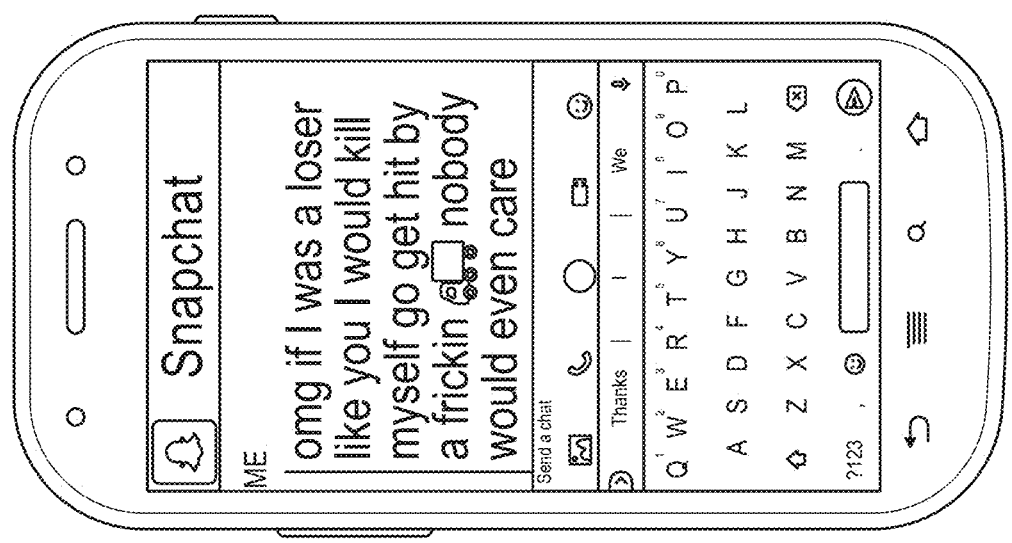
FIG. 5 shows an illustrative user interface depicting an abusive chat session in a Snapchat application, according to one embodiment.
Figure 6:
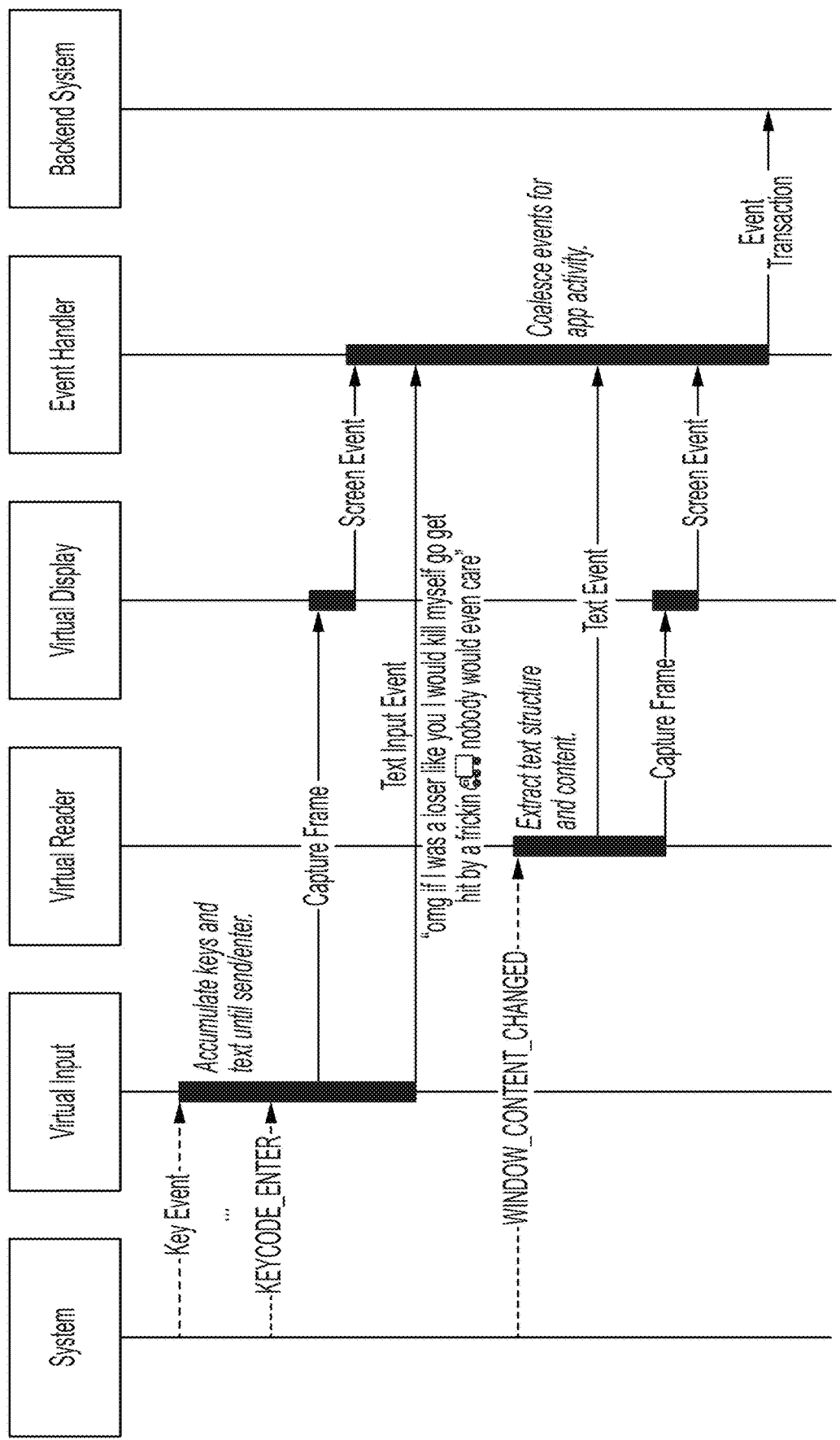
FIG. 6 shows example events that trigger capture of textual information and display frames at the mobile device, according to one embodiment.

Given the sample abusive chat session of FIG. 5, there are two main events that trigger capture, as shown in FIG. 6, for example:

Virtual Keyboard: OnKeyListener:KeyEvent.KEYCODE_ENTER

Screen Reader: OnAccessibilityEvent:WINDOW_CONTENT_CHANGED

According to various embodiments, both functions cause text to be extracted (either from the accumulated text entered, or from the virtual screen reader) and trigger captures of the current screen frame buffer. FIG. 7 depicts an example screen frame captured by the virtual display component.

Complete text structure that may be extracted includes a lot more detail, but an overview to provide illustrative examples follows the general form below:

```
{
  "packageName": "com.snapchat.android",
  "class": "FrameLayout",
  "boundsInParent": { }, "boundsInScreen": { },
  "nodes": [
    {
      "class": "ViewPager/pager",
      "boundsInParent": { }, "boundsInScreen": { },
      "nodes": [
        {
          "class": "RelativeLayout/chat_fragment_layout",
          "boundsInParent": { }, "boundsInScreen": { },
          "nodes": [
            {
              "class": "TextView/chat_message_header_title",
              "text": "ME",
              "boundsInParent": { }, "boundsInScreen": { }
            },
            {
              "class": "TextView/chat_message_user_text",
              "text": "omg if I was a loser like you I would kill myself go get hit by a frickin  nobody would even care",
              "boundsInParent": { }, "boundsInScreen": { }
            },
            {
              "class": "EditText/chat_input_text_field",
              "text": "Send a chat",
              "boundsInParent": { }, "boundsInScreen": { }
            }
          ]
        }
      ]
    }
  ]
}
```

Figure 8:
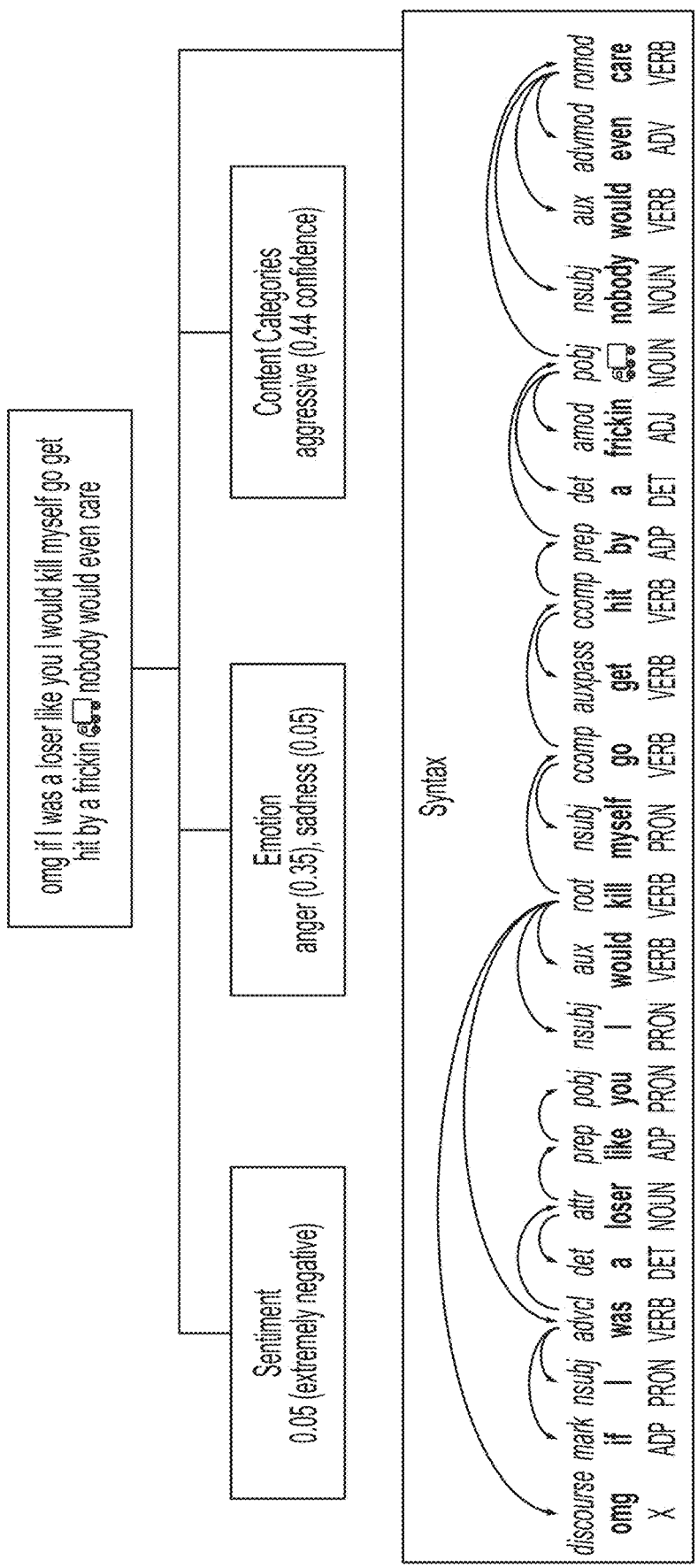
FIG. 8 shows example textual analysis performed by the backend system, according to one embodiment.
Figure 9:
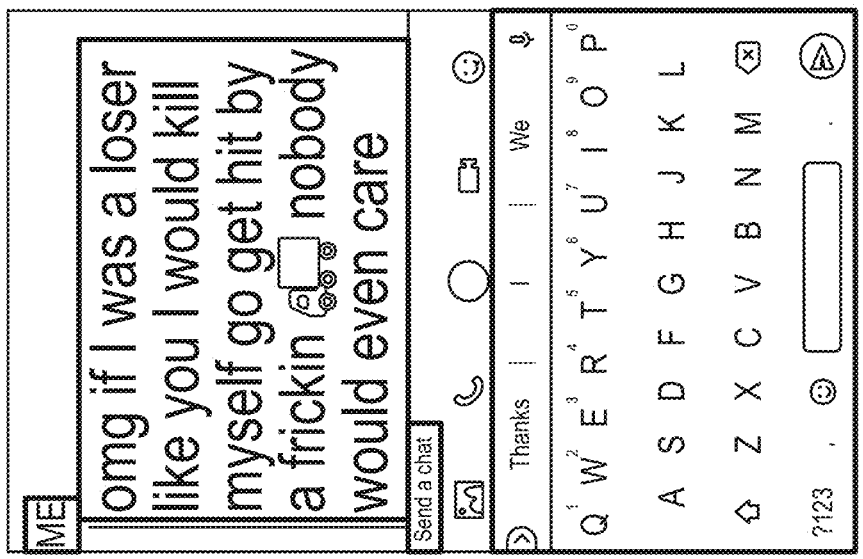
FIG. 9 shows example image analysis performed by the backend system, according to one embodiment.

The backend system performs textual analysis (as shown in FIG. 8, for example) and image analysis (as shown in FIG. 9, for example) on the captured information to detect an activity of interest or concern.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure, and are intended to be within the scope of the examples discussed herein. Accordingly, the foregoing description and drawings are by way of example only.

Various aspects and functions described herein may be implemented as specialized hardware or software components executing processors of one or more specialized computer systems, which can include mobile computing devices (e.g., smart phones, tablet computers, and personal digital assistants) and network equipment (e.g., load balancers, routers, and switches). Examples of particular models of mobile computing devices include iPhones, and iPads running iOS operating systems available from Apple, Android devices like Samsung Galaxy Series, LG Nexus, and Motorola Droid X, Blackberry devices available from Blackberry Limited, and Windows Phone devices. Further, aspects may be located on a single computer system or may be distributed among a plurality of computer systems connected to one or more communications networks.

Figure 10:
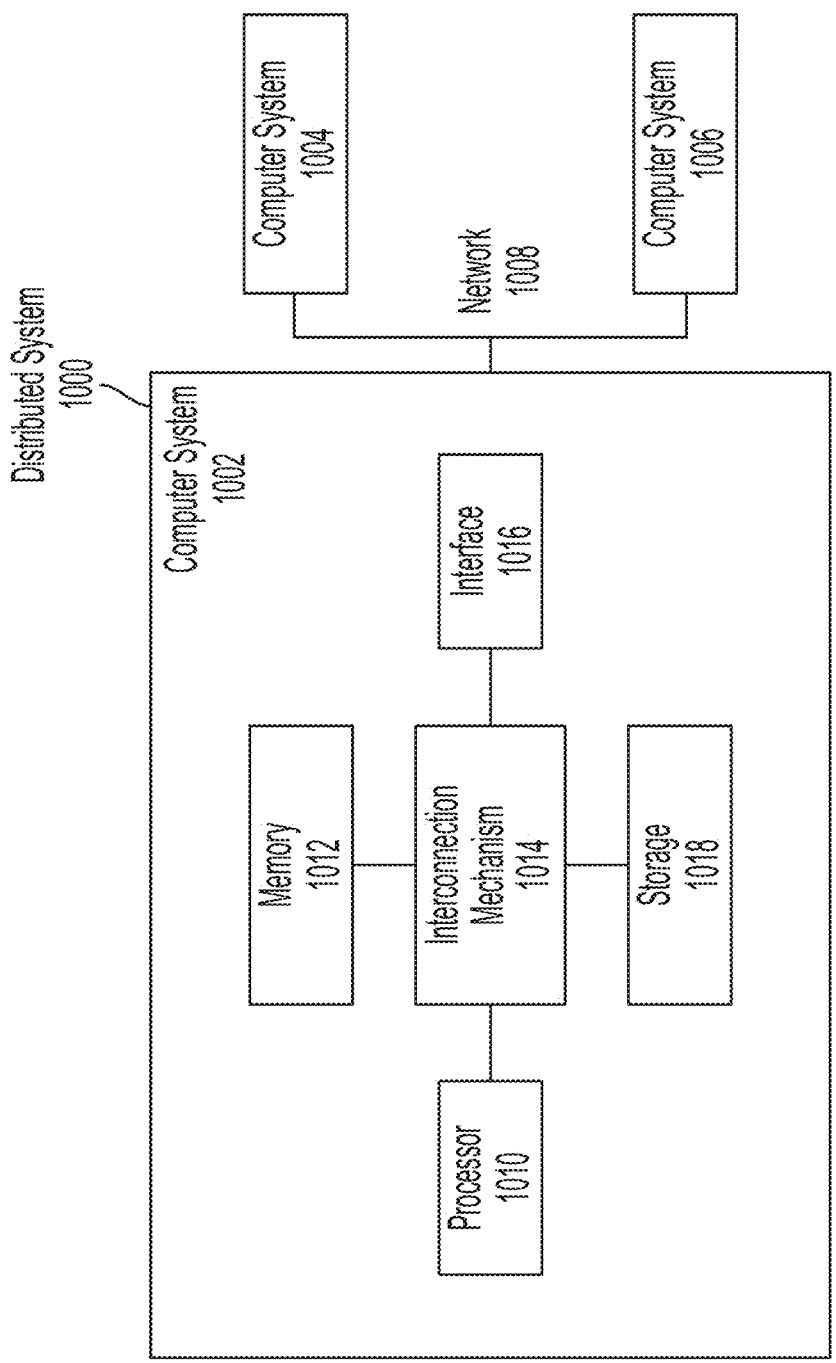
FIG. 10 is a schematic diagram of an exemplary computer system that may be specially configured to perform processes and functions disclosed herein, according to one embodiment.

For example, various aspects, functions, and processes may be distributed among one or more computer systems configured to provide a service to one or more client computers, or to perform an overall task as part of a distributed system, such as the distributed computer system 1000 shown in FIG. 10. Additionally, aspects may be performed on a client-server or multi-tier system that includes components distributed among one or more server systems that perform various functions. Consequently, embodiments are not limited to executing on any particular system or group of systems. Further, aspects, functions, and processes may be implemented in software, hardware or firmware, or any combination thereof. Thus, aspects, functions, and processes may be implemented within methods, acts, systems, system elements and components using a variety of hardware and software configurations, and examples are not limited to any particular distributed architecture, network, or communication protocol.

Referring to FIG. 10, there is illustrated a block diagram of a special purpose distributed computer system 1000, in which various aspects and functions are practiced. According to various embodiments, the system 1000 provides new functionality over conventional computers based on the operations described herein. In further embodiments, system 1000 improves over the security provides by conventional system as discussed above.

As shown, the distributed computer system 1000 includes one or more computer systems that exchange information. More specifically, the distributed computer system 1000 includes computer systems 1002, 1004, and 1006. As shown, the computer systems 1002, 1004, and 1006 are interconnected by, and may exchange data through, a communication network 1008. The network 1008 may include any communication network through which computer systems may exchange data. To exchange data using the network 1008, the computer systems 1002, 1004, and 1006 and the network 1008 may use various methods, protocols and standards, including, among others, Fiber Channel, Token Ring, Ethernet, Wireless Ethernet, Bluetooth. IP, IPV6, TCP/IP, UDP, DTN, HTTP, FTP, SNMP, SMS, MMS, SS2, JSON, SOAP, CORBA, REST, and Web Services. To ensure data transfer is secure, the computer systems 1002, 1004, and 1006 may transmit data via the network 1008 using a variety of security measures including, for example, TLS or VPN technologies. While the distributed computer system 1000 illustrates three networked computer systems, the distributed computer system 1000 is not so limited and may include any number of computer systems and computing devices, networked using any medium and communication protocol.

As illustrated in FIG. 10, the computer system 1002 includes a processor 1010, a memory 1012, an interconnection element 1014, an interface 1016 and data storage element 1018. To implement at least some of the aspects, functions, and processes disclosed herein, the processor 1010 performs a series of instructions that result in manipulated data. The processor 1010 may be any type of processor, multiprocessor or controller. Example processors may include a commercially available processor such as an Intel Xeon, Itanium, Core, Celeron, or Pentium processor; an AMD Opteron processor; an Apple A4 or A5 processor; a Sun UltraSPARC processor; an IBM Power5+ processor; an IBM mainframe chip; or a quantum computer. The processor 1010 is connected to other system components, including one or more memory devices 1012, by the interconnection element 1014.

The memory 1012 stores programs (e.g., sequences of instructions coded to be executable by the processor 1010) and data during operation of the computer system 1002. Thus, the memory 1012 may be a relatively high performance, volatile, random access memory such as a dynamic random access memory ("DRAM") or static memory ("SRAM"). However, the memory 1012 may include any device for storing data, such as a disk drive or other nonvolatile storage device. Various examples may organize the memory 1012 into particularized and, in some cases, unique structures to perform the functions disclosed herein. These data structures may be sized and organized to store values for particular data and types of data.

Components of the computer system 1002 are coupled by an interconnection element such as the interconnection element 1014. The interconnection element 1014 may include any communication coupling between system components such as one or more physical busses in conformance with specialized or standard computing bus technologies such as IDE, SCSI, PCI and InfiniBand. The interconnection element 1014 enables communications, including instructions and data, to be exchanged between system components of the computer system 1802.

The computer system 1002 also includes one or more interface devices 1016 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 1002 to exchange information and to communicate with external entities, such as users and other systems.

The data storage element 1018 includes a computer readable and writeable nonvolatile, or non-transitory, data storage medium in which instructions are stored that define a program or other object that is executed by the processor 1010. The data storage element 1018 also may include information that is recorded, on or in, the medium, and that is processed by the processor 1010 during execution of the program. More specifically, the information may be stored in one or more data structures specifically configured to conserve storage space or increase data exchange performance. The instructions may be persistently stored as encoded signals, and the instructions may cause the processor 1010 to perform any of the functions described herein. The medium may, for example, be optical disk, magnetic disk or flash memory, among others. In operation, the processor 1010 or some other controller causes data to be read from the nonvolatile recording medium into another memory, such as the memory 1012, that allows for faster access to the information by the processor 1010 than does the storage medium included in the data storage element 1018. The memory may be located in the data storage element 1018 or in the memory 1012, however, the processor 1010 manipulates the data within the memory, and then copies the data to the storage medium associated with the data storage element 1018 after processing is completed. A variety of components may manage data movement between the storage medium and other memory elements and examples are not limited to particular data management components. Further, examples are not limited to a particular memory system or data storage system.

Although the computer system 1002 is shown by way of example as one type of computer system upon which various aspects and functions may be practiced, aspects and functions are not limited to being implemented on the computer system 1002 as shown in FIG. 10. Various aspects and functions may be practiced on one or more computers having a different architectures or components than that shown in FIG. 10. For instance, the computer system 1002 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 1002 may be a computer system including an operating system that manages at least a portion of the hardware elements included in the computer system 1002. In some examples, a processor or controller, such as the processor 1010, executes an operating system. Examples of a particular operating system that may be executed include a Windows-based operating system, such as, the Windows-based operating systems, available from the Microsoft Corporation, a MAC OS System X operating system or an iOS operating system available from Apple Computer, one of many Linux-based operating system distributions, for example, the Enterprise Linux operating system available from Red Hat Inc., or a UNIX operating system available from various sources. Many other operating systems may be used, and examples are not limited to any particular operating system.

The processor 1010 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as Java, C++, C# (C-Sharp), Python, JavaScript, Scala. Other object-oriented programming languages may also be used. Alternatively, functional, scripting, or logical programming languages may be used.

Additionally, various aspects and functions may be implemented in a non-programmed environment. For example, documents created in HTML, XML or other formats, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user space application) or in a commonly shared data structure (such as an application registry that is defined by an operating system). In addition, some examples provide for both system and user interfaces that allow external entities to modify the parameters and thereby configure the behavior of the components.

Based on the foregoing disclosure, it should be apparent to one of ordinary skill in the art that the embodiments disclosed herein are not limited to a particular computer system platform, processor, operating system, network, or communication protocol. Also, it should be apparent that the embodiments disclosed herein are not limited to a specific architecture or programming language.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements.

The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Use of at least one of and a list of elements (e.g., A, B, C) is intended to cover any one selection from A, B, C (e.g., A), any two selections from A, B, C (e.g., A and B), any three selections (e.g., A, B. C), etc., and any multiples of each selection. Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer implemented method for dynamically evaluating execution of an application on a mobile device, the method comprising:

using at least one computer hardware processor executing on the mobile device to perform:
    capturing one or more display frames associated with the application executing on the mobile device;
    capturing textual information associated with the application executing on the mobile device;
    detecting user input associated with the application executing on the mobile device;
    identifying, based on the captured display frames, the captured textual information and/or the detected user input, at least one functionality that is different from a known functionality of the application;
    generating an application profile associated with the application, the application profile including information regarding the identified at least one functionality;
    blocking the identified at least one functionality of the application prior to execution of the at least one functionality on the mobile device; and
    modifying collection of data at least in part by increasing a sample rate of capturing the one or more display frames and capturing the textual information, wherein the captured textual information comprises information regarding one or more structural components of the application.

2. The computer implemented method of claim 1, wherein the application profile comprises information regarding declared or known functionalities of the application and the identified at least one functionality comprises a new functionality that is different from the declared or known functionalities of the application.

3. The computer implemented method of claim 1, further comprising evaluating collected data including the captured display frames, the captured textual information, and the detected user input to identify an activity of interest or concern associated with the application.

4. The computer implemented method of claim 3, wherein the activity of interest or concern comprises one or more of the following: participating in dangerous or harmful conversations via the application; and viewing, receiving, modifying, or sending dangerous or harmful content via the application.

5. The computer implemented method of claim 1, wherein:
    modifying the collection of data comprises modifying the collection of data based on evaluating collected data including the captured display frames, the captured textual information, and/or the detected user input.

6. A computer implemented method for monitoring user activity at a mobile device, the method comprising:
    using at least one computer hardware processor executing on the mobile device to perform:
        capturing one or more display frames associated with an application executing on the mobile device;
        capturing textual information associated with the application;
        detecting user input associated with the application;
        evaluating collected data including the captured display frames, the captured textual information, and the detected user input to identify an activity of interest or concern associated with the application;
        identifying, based on the captured display frames, the captured textual information and/or the detected user input, at least one functionality that is different from a known functionality of the application;
        generating an application profile associated with the application, the application profile including information regarding the identified at least one functionality; and
        modifying collection of data at least in part by increasing a sample rate of capturing the one or more display frames and capturing the textual information, wherein the captured textual information comprises information regarding one or more structural components of the application.

7. The method of claim 6, wherein the activity of interest or concern comprises one or more of the following: participating in dangerous or harmful conversations via the application; and viewing, receiving, modifying, or sending dangerous or harmful content via the application.

8. The method of claim 6, further comprising determining the one or more display frames to be captured based on user interactions detected at the mobile device, wherein the user interactions comprise one or more user gestures intercepted at the mobile device.

9. The method of claim 8, wherein determining the one or more display frames to be captured comprises:
    detecting one or more window change events caused by the user interactions detected at the mobile device; and
    determining the one or more display frames to be captured based on the detected window change events.

10. The method of claim 8, wherein determining the one or more display frames to be captured comprises:
    detecting one or more content change events caused by the user interactions detected at the mobile device; and
    determining the one or more display frames to be captured based on the detected content change events.

11. The method of claim 6, further comprising:
    determining contextual information associated with the mobile device and the application executing on the mobile device.

12. The method of claim 6, further comprising:
    extracting text from the captured display frames using optical character recognition techniques.

13. The method of claim 12, further comprising:
    comparing the captured textual information and the extracted text to remove duplicate text.

14. The method of claim 12, further comprising:
    identifying one or more items to be removed from the extracted text; and
    filtering the extracted text based on the identified items.

15. A system for monitoring user activity comprising:
    a mobile device comprising at least one processor, operatively connected to a memory, the at least one processor when executing is configured to:
        monitor one or more user interactions detected at the mobile device with respective applications installed on the mobile device, wherein monitoring the one or more user interactions comprises:
            capturing one or more display frames associated with the applications,
            capturing textual information associated with the applications, and
            detecting user input associated with the applications,
        communicate collected data including the captured display frames, the captured textual information and the detected user input to a backend system; and
        modify collection of data at least in part by increasing a sample rate of capturing the one or more display frames and capturing the textual information, wherein the captured textual information comprises information regarding one or more structural components of the application; and the backend system comprising at least one processor, operatively connected to a memory, the at least one processor when executing is configured to:
analyze the collected data to detect an activity of interest or concern,
identify, for an application and based on analysis of the collected data, one or more functionalities that are different from declared or known functionalities of the application; and
generate one or more application models associated with the respective applications, the generating comprising generating an application model for the application including information regarding the identified one or more functionalities.

16. The system of claim 15, wherein the at least one processor at the backend system is further configured to:
generate one or more alerts based on the detected activity of interest or concern.

17. The system of claim 16, wherein the one or more alerts include at least a portion of the collected data that caused the one or more alerts to be generated and the contextual information.

18. The system of claim 17, wherein the collected data further includes contextual information associated with the mobile device and the applications installed on the mobile device.

19. The system of claim 15, wherein analyzing the collected data comprises:
extracting text from the captured display frames using optical character recognition techniques.

20. The system of claim 19, wherein analyzing the collected data comprises:
comparing the captured textual information and the extracted text to remove duplicate text.

* * * * *